(12) United States Patent
Losnedal et al.

(10) Patent No.: US 9,506,211 B2
(45) Date of Patent: Nov. 29, 2016

(54) PLATFORM FOR CONTROLLED CONTAINMENT OF HYDROCARBONS

(75) Inventors: Frode Losnedal, Bjørnøyhamn (NO); Robert Farestveit, Follese (NO); Per Albriktsen, Fana (NO); Ove Tobias Gudmestad, Naerbø (NO); Geir Morten Skeie, Oslo (NO)

(73) Assignee: Odfjell Drilling Technology Ltd., Hamilton (BM)

( * ) Notice: Subject to any disclaimer, the term of this patent is extended or adjusted under 35 U.S.C. 154(b) by 539 days.

(21) Appl. No.: 13/575,877

(22) PCT Filed: Jan. 27, 2011

(86) PCT No.: PCT/NO2011/000030
§ 371 (c)(1),
(2), (4) Date: Dec. 18, 2012

(87) PCT Pub. No.: WO2011/093718
PCT Pub. Date: Aug. 4, 2011

(65) Prior Publication Data
US 2013/0084136 A1    Apr. 4, 2013

(30) Foreign Application Priority Data

Jan. 28, 2010 (NO) .................................. 20100138

(51) Int. Cl.
| | | |
|---|---|---|
| *E02B 17/02* | (2006.01) | |
| *E21B 43/01* | (2006.01) | |
| *E02B 17/00* | (2006.01) | |

(52) U.S. Cl.
CPC .............. *E02B 17/02* (2013.01); *E02B 17/00* (2013.01); *E02B 17/0021* (2013.01); *E21B 43/0122* (2013.01); *E02B 2017/0043* (2013.01);

(Continued)

(58) Field of Classification Search
CPC ........... E03B 17/02; E03B 2017/0039; E03B 2017/0043
USPC ................ 405/203, 204, 205, 206, 207, 224
See application file for complete search history.

(56) References Cited

U.S. PATENT DOCUMENTS 3,624,702 A * 11/1971 Meheen ......................... 405/227
3,698,198 A    10/1972 Phelps
(Continued)

FOREIGN PATENT DOCUMENTS

| GB | 2 002 939 A | 2/1979 |
|---|---|---|
| GB | 2063776 A | 6/1981 |

OTHER PUBLICATIONS

International Search Report of PCT/NO2011/000030 dated Apr. 12, 2011.

*Primary Examiner* — Frederick L Lagman
(74) *Attorney, Agent, or Firm* — Foley & Lardner LLP

(57) ABSTRACT

The invention relates to a concept for controlled containment of oil and condensate and possibly other types of liquids and chemicals in constructions as a possible failure of the conventional prior art barriers used in offshore petroleum exploration and production activities, intended for use at several water depths. The concept comprises a support structure (10) and a deck structure (14) positioned on top of the support structure (10), from where drilling may be performed, and where possible spillage of hydrocarbons from the drilling or production activities, in case of failure of the conventional barriers, will be contained and directed in a controlled manner to collecting storage tanks (46) integrated in the support structure (10).

7 Claims, 10 Drawing Sheets

(52) U.S. Cl.
CPC *E02B2017/0052* (2013.01); *E02B 2017/0069* (2013.01); *E02B 2017/0086* (2013.01)

(56) References Cited

U.S. PATENT DOCUMENTS

| | | | | |
|---|---|---|---|---|
| 3,976,021 | A * | 8/1976 | Blenkarn | B63B 21/502 |
| | | | | 114/265 |
| 3,982,492 | A * | 9/1976 | Steddum | B63B 21/502 |
| | | | | 114/265 |
| 4,062,313 | A * | 12/1977 | Stram | B63B 21/502 |
| | | | | 114/265 |
| 4,170,186 | A | 10/1979 | Shaw | |
| 4,293,239 | A * | 10/1981 | Petty et al. | 405/204 |
| 4,417,831 | A | 11/1983 | Abbott et al. | |
| 4,702,321 | A * | 10/1987 | Horton | B63B 35/4413 |
| | | | | 114/256 |
| 4,793,739 | A * | 12/1988 | Hasle et al. | 405/227 |
| 4,906,139 | A * | 3/1990 | Chiu | B63B 9/065 |
| | | | | 114/265 |
| 4,936,710 | A * | 6/1990 | Petty | E21B 17/01 |
| | | | | 114/265 |
| 4,938,632 | A * | 7/1990 | Eie | B63B 21/502 |
| | | | | 114/265 |
| 5,226,750 | A * | 7/1993 | Meheen | 405/207 |
| 5,984,586 | A * | 11/1999 | Wudtke | B63B 21/16 |
| | | | | 114/293 |
| 6,022,174 | A * | 2/2000 | Husvik | B63B 21/502 |
| | | | | 405/195.1 |
| 6,244,785 | B1 * | 6/2001 | Richter et al. | 405/224 |
| 6,431,107 | B1 * | 8/2002 | Byle | B63B 21/502 |
| | | | | 114/264 |
| 7,674,073 | B2 * | 3/2010 | Heskin et al. | 405/204 |
| 2001/0036387 | A1 * | 11/2001 | Richter et al. | 405/205 |
| 2002/0176747 | A1 * | 11/2002 | Hanna | B63B 21/502 |
| | | | | 405/224 |

* cited by examiner

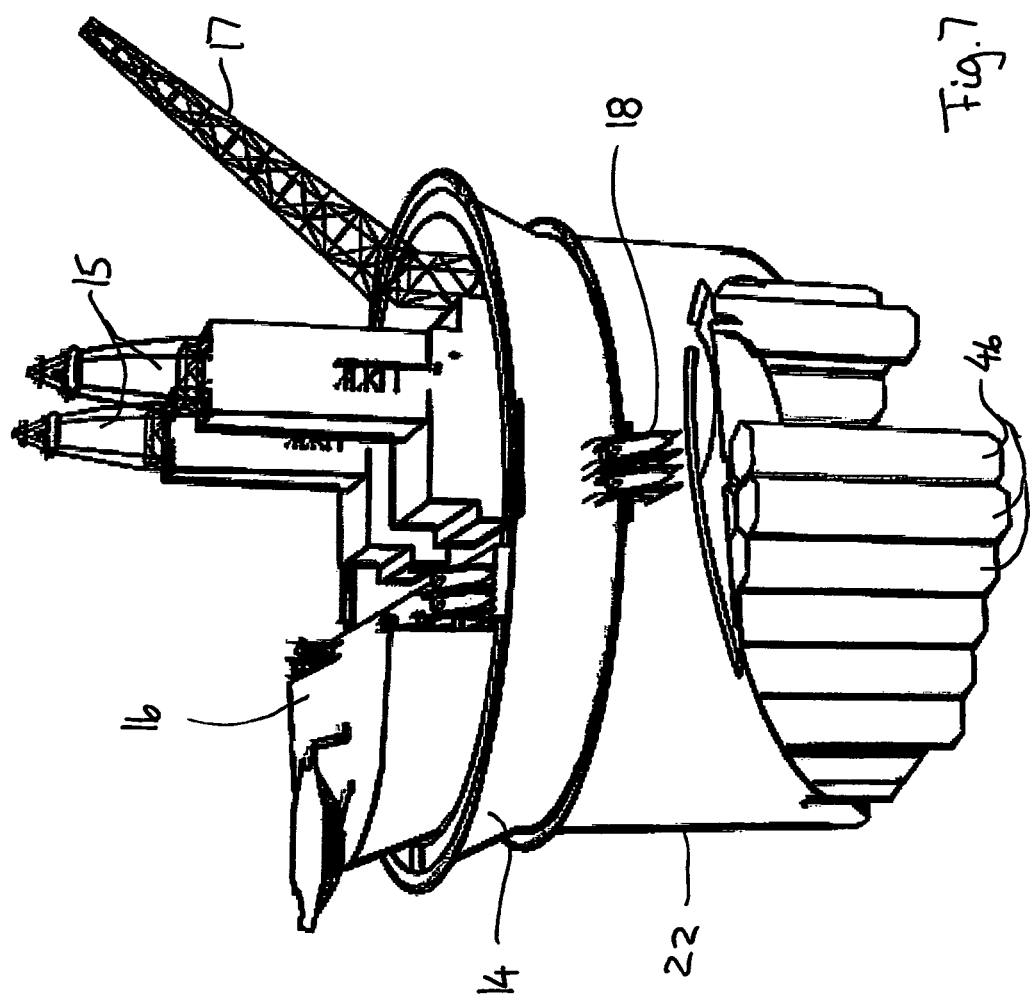

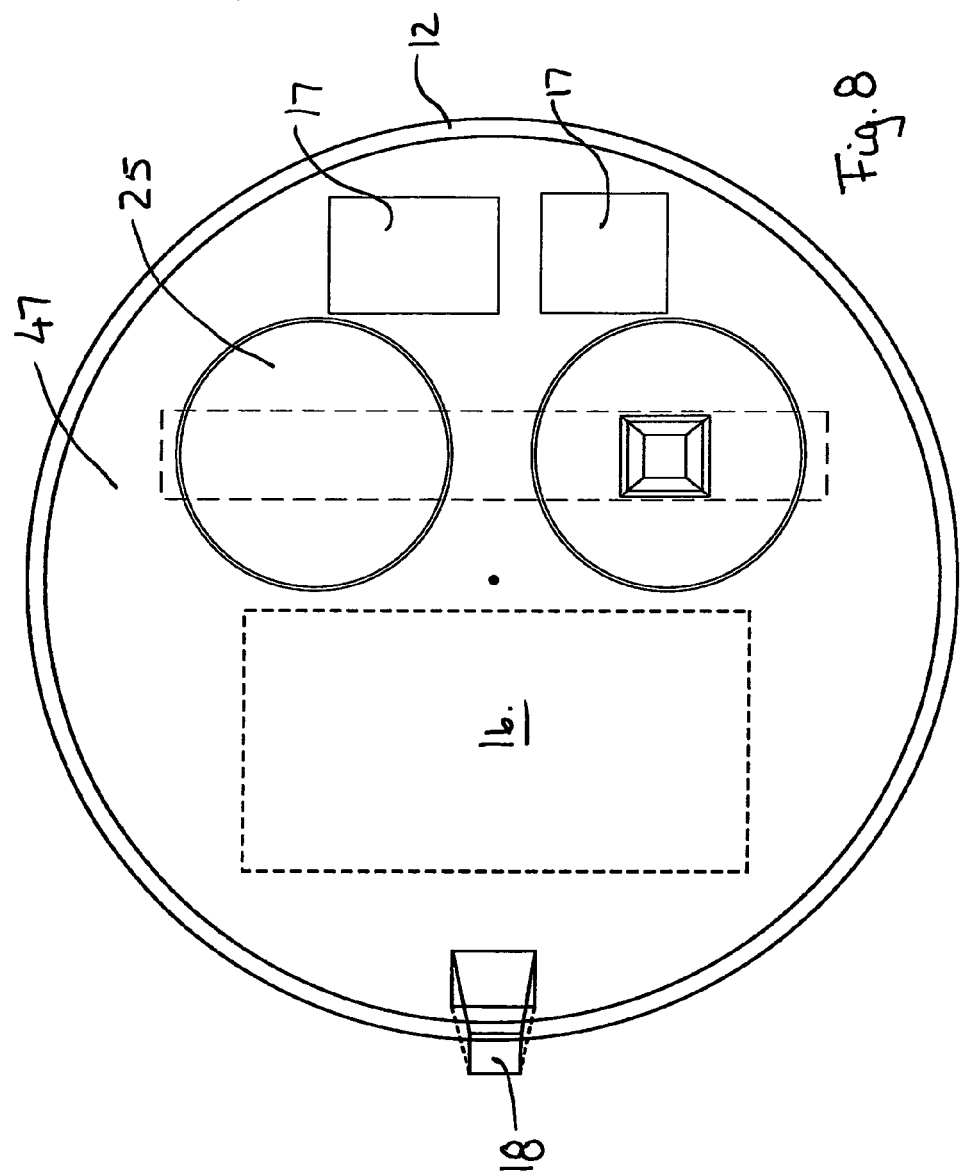

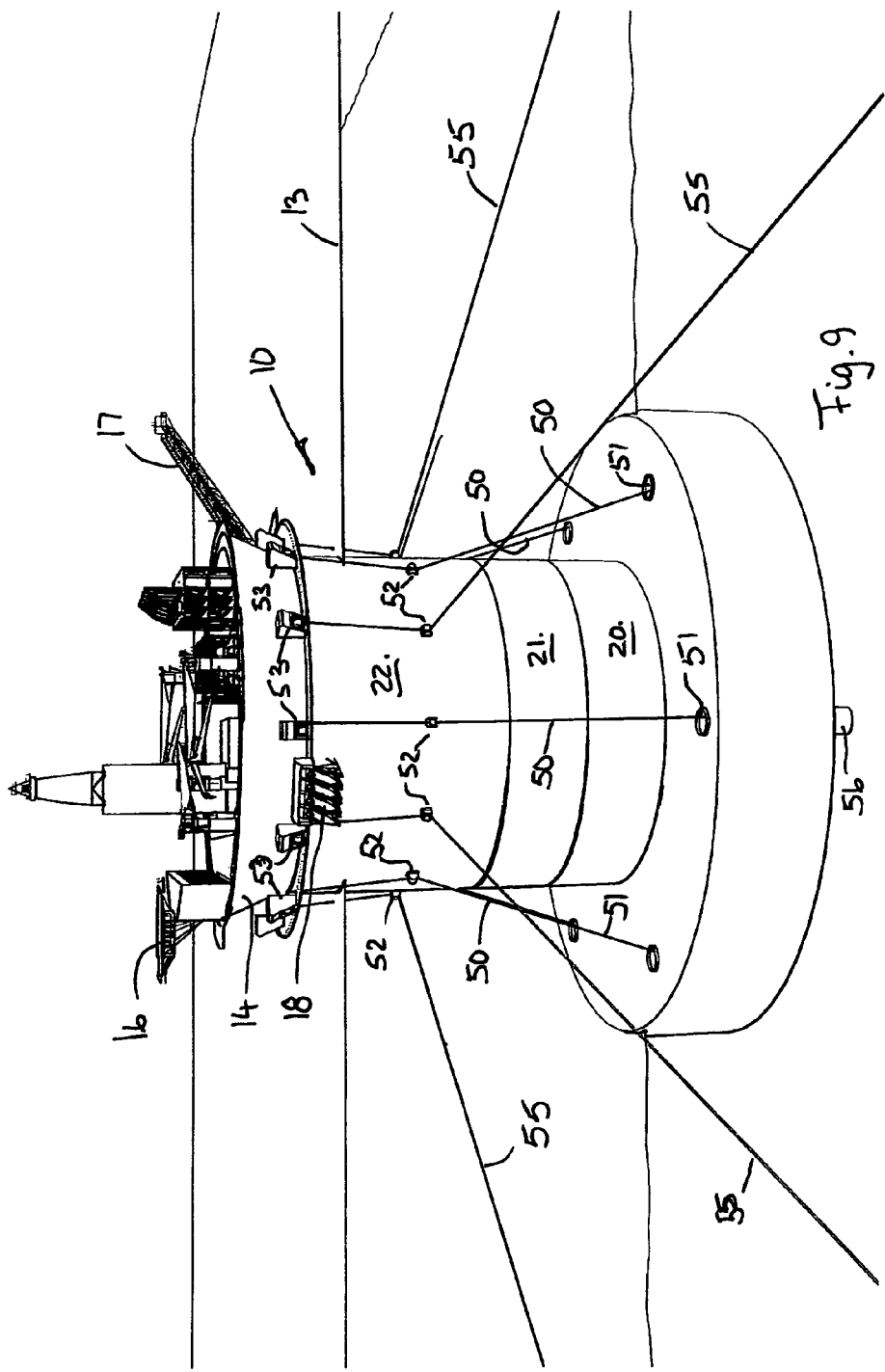

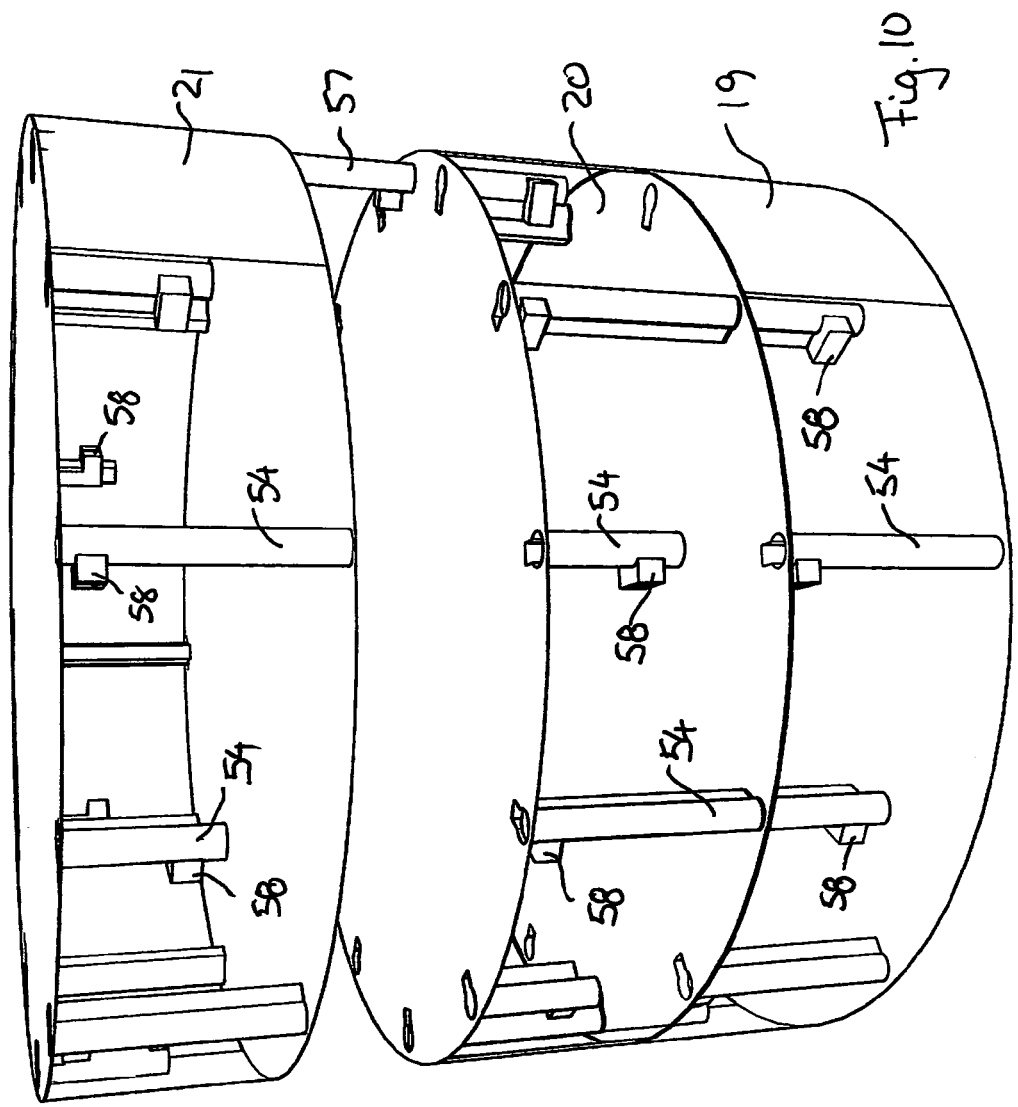

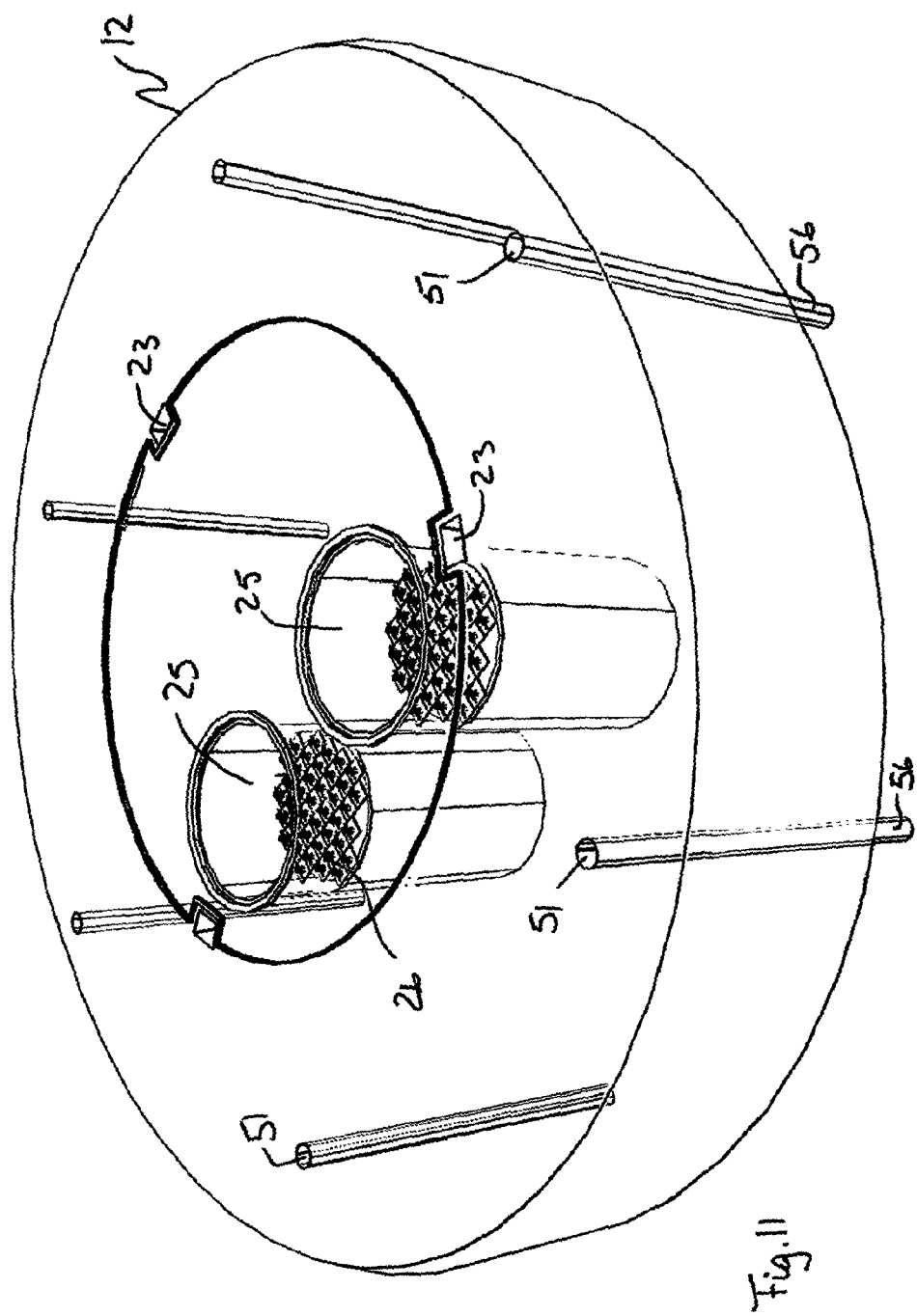

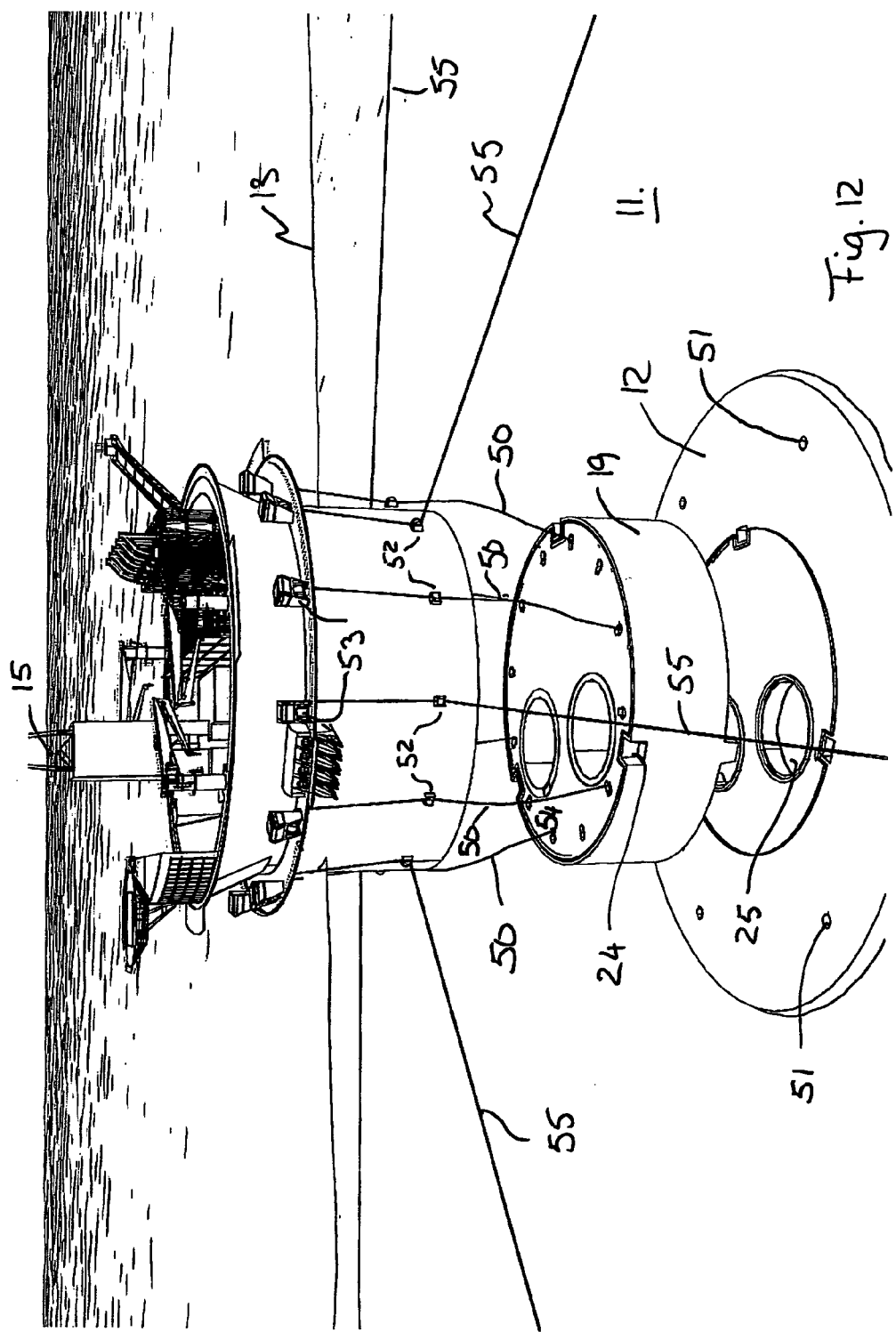

PLATFORM FOR CONTROLLED CONTAINMENT OF HYDROCARBONS

CROSS REFERENCE TO RELATED APPLICATIONS

The present application is a National Stage of International Application No. PCT/NO2011/000030 filed on Jan. 27, 2011, which claims the benefit of Norwegian Patent Application No. 20100138 filed Jan. 28, 2010. The entire disclosures of which are incorporated herein by reference.

THE TECHNICAL FIELD OF THE INVENTION

The present invention relates to a concept for controlled containment of oil and condensate and possible other liquids and chemicals from platforms as a consequence of failure of safety barriers used to-day in offshore hydrocarbon exploitation, employed at several different water depths.

The Invention relates also to a method for installing and/or removal of such a platform concept.

BACKGROUND OF THE INVENTION

When exploring for hydrocarbons in waters subject to very rigid environmental requirements and with the requirements of zero pollution, new overall concepts and solutions must be developed in order to satisfy such environmental and political requirements. The concept for zero pollution requires a total and complete barrier solution against the surrounding sea and the marine life, covering all types of drilling and production spillage, including a blow out, pollution, spillage from the drilling system and other unintentional accidents. Such a concept must ensure that drilling as well as production operations may be performed without any type of environmental effects directly or indirectly on the waters where the platforms are installed.

For conventional type of exploration of hydrocarbons, such as drilling or maintenance operations of production wells, situations may occur where an uncontrolled blow-out may occur and where the hydrocarbons from such blow-out will end directly into the sea. When production and precaution barriers have failed, only traditional oil skimming and bilge equipment will be available for collecting the spillage. Such equipment has, however, large inherent limitations with respect to efficiency, reliability or to temperature, wave or wind limitations.

Traditionally, a drilling unit is made with full venting and discharge to sea in order to get rid of uncontrolled leakage. The risks that undesired accidents may occur in waters close to shore makes traditional drilling platforms unsuitable for use in specific vulnerable and sensitive areas.

Several solutions for preventing such undesired leakage to the sea have previously been proposed. U.S. Pat. No. 3,698, 198 describes an offshore platform of the type resting on the seabed and consisting of a plurality of assembled buoyancy bodies, stacked on top of each other. In assembled state the various buoyancy bodies are held together by tensioned cables, extending from the deck on the upper buoyancy body to the base structure resting on the seabed. Two adjoining sections may be interlocked by means of bolts and nuts. The offshore platform according to the US publication is also provided with a single cell extending between the deck, arranged above the sea level, and the base structure on the seabed. Drilling is performed from the deck, down through the vertical cell and down into the seabed, the vertical cell being with out a bottom. Each buoyancy body is provided with buoyancy chambers arranged around the vertical cell. Further, the sell has openings enabling water to be pumped from a neighboring body positioned below or on top. Each buoyancy body is also provided with downwards projecting parts at its lower end and co-acting upwards projecting locking elements at the upper surface of each buoyancy body, enabling installation and interlocking with a consecutive buoyancy body.

GB 2063776 relates to a solution for collecting oil and gas from a blow out where a umbrella-like body is lowered down over a leaking well, the umbrella-like body collecting oil and gas and allowing the leaked fluid to flow from the area of leakage into a vessel and/or to a flare means. Further, the umbrella-like means may be connected to an expandable cylindrical chute brought into place down and over the leaking area, so that a more or less shielded ring or cylinder is provided over and around the flow of leaking fluid.

Based on the discomfort as described above, there is a need for development of improved systems for collecting leaked hydrocarbons and a concept for protecting the environment, avoiding leakage of hydrocarbons to the sea and at the same time providing solutions which are rigid, stable and able to resist the environmental forces appearing at the offshore site.

SUMMARY OF THE INVENTION

An object of the invention is to provide a solution which increases the safety and reducing the risk for unintentional leakage of undesirable liquids into the surrounding sea and at the same time improves the assembling and interlocking process of separate buoyancy members to form a stable construction, so that the construction will be in better condition for resisting and withstanding the environmental forces appearing at the installation site, and also possibly make it possible to construct the platform in a simple and efficient manner and also to be able to separate the units for possible re-used at a different site.

A further object of the invention is to provide a solution where the forces contributing to keeping the various construction elements assembled may be controlled and adjusted, so that sufficient pre-stressing forces are produced enabling the assembled platform at any time to withstand the appearing forces and moments acting on the platform, caused by the environmental forces.

A further object of the present invention is in an improved manner to secure that oil and gas which may leak out of a well or a riser is prevented from coming into contact with the surrounding sea around the platform.

A still further object of the present invention is to provide an improved solution, which subsequent to completed operation, does not leave any detrimental obstacles on the seabed which may make it difficult for fishing with nets and trawls and which in a simple manner also may be removed from the installation site.

Yet another object of the invention is to provide an improved solution which may be re-used and which, by simple means, may be adjusted to different water depths.

A further object of the present invention is to provide a solution which temporarily may store large volumes of leaked oil.

It is also an object of the present invention to provide a solution which also may function as a support for drilling and production equipment.

Yet a further object of the invention is to provide a solution which, in an effective manner, may collect leaked oil, even in heavy seas with wave heights caused by a 100-year storm.

A further object of the present invention is to provide a solution which is secured against spillage also after a ship collision.

The objects according to the present invention are obtained by a solution as further defined by the independent patent claims. Possible embodiments and alternatives are defined by the dependent claims.

According to the invention a platform is provided comprising a support structure and a deck structure positioned on top of the support structure, from where drilling may be performed, and where possibly hydrocarbons, which has leaked out during the drilling operations, may be collected in case the conventional barriers should fail, the support structure being configured to surround the leaked oil and direct in a controlled manner such leaked oil to collecting tanks forming an integrated part of the support structure. The platform is made up of a base structure intended to rest on the seabed, and a number of separate floating bodies which are stacked on top of each other and interconnected, resting on the base structure due to the weight of the floating bodies and ballast water, said floating bodies also being locked to the base structure by means of vertical anchoring cables evenly distributed around the periphery of the platform. Further, the system comprises a plurality of mooring cables, moored to the seabed at large distance from the platform, the mooring cables being connected to the platform via fairleads and winches.

According to one embodiment of the invention each of said vertical tensioned cables may be connected at one end to the base structure and at the other end to winches on the platform deck, preferably via fairleads.

Further, the base structure may possibly be fixed to the seabed by means of a plurality of piles or casings which are pressed and cemented deeply down into the seabed soil.

The fixing points for the vertically tensioned cables may in such case preferably coincide with the upper end of said piles or casings.

According to a further embodiment also locking bolts or tie rods placed in cylindrical ducts and extending across the interface between two consecutive platform sections may be used, each locking bolts or tie rod at their upper and lower ends being provided with locking surfaces co-acting with corresponding locking surfaces in said cylindrical ducts, the locking effect being established by rotating the bolts or tie rods with respect to the ducts.

The various construction elements forming the platform consist of independent self-floating elements which may be independently manoeuvered into position, mainly by towing and ballasting, and these elements may preferably be assembled by means of guiding means or dowels and corresponding openings in the opposing surfaces of the sections which are positioned over or under the guiding means or dowels.

All elements may have vertical open cells ("drilling shafts") for installation of wells and with well penetrations in the lower part of the base structure; and with drilling equipment arranged on top at the deck of the platform.

Said drilling shaft may be sealed against intrusion of water from the exterior, in that the assembly is constructed such that a watertight integrity is achieved. Further, a cutoff valve may be introduced, positioned in the base element as an extra barrier, connected to high pressure risers and terminated at the deck level by conventional blow out preventers (BOP) and safety valves.

One or more of the elements, the base structure, the intermediate elements or the top element may preferably, but not necessarily, be made of concrete.

The present complete protection concept represents a combination of well proven technologies which makes it possible to execute development, exploration, and production of hydrocarbons specifically in environmentally sensitive offshore waters with a level of safety with respect to pollution which is substantially higher than conventional petroleum activities on the Norwegian Continental Shelf or world wide.

The concept provides full protection of vulnerable environmental resources and secures that activities do not threaten the traditional fishery and environmental interests in the offshore regions. The concept introduces an assurance of zero pollution to sea, founded in a new way of combining technologies.

In accordance with this concept all traditional pollution risks may be minimized. This implies that the following points are taken care of, if necessary:

Introduction of new barriers and principles for probability and consequence reduction for all type of incidents from for example production deviations to severe accident incidents.

Re-injection of drill mud and resulting drill cuttings from the drilling operation and possibly produced water.

Zero spillage of drill fluids for all drilling hole sections.

The zero spillage effect contributed to by the concept will apply for all the drilled sections which per today is accepted according to the prior art solutions.

The presumption for the concept is that it gives a solution which satisfies the highest requirements for robustness of the barriers with respect to spillage to sea, while the safety requirements for personnel operating the plant are maintained.

According to the present invention a concrete structure is provided, comprising a built-in tank, a surrounding construction or an annulus body which surrounds and represents a supporting structure for deck equipment and the drill package. The plant has the following properties:

1. The base structure and the skirt (the elongation of the base structure to be pressed down into the seabed) may be able to transfer the loads imposed by the construction into the seabed soil (based on geotechnical data).
2. The construction shall resist the effects of current and waves, also the relatively strong sea current which may exist in waters close to shore.
3. An upper "element" of the platform giving support for a drill package, living quarter, helicopter deck, cranes and evacuation routes/lifesavings means (life rafts), gangways and escape routes and landing areas for goods craned from supply vessels. The total available deck area may be in the region of 10,000 $m^2$. Extra capacity for storing/handling of pipe racks may also be available.
4. The drill package (estimated to 3.400 tonnes) may be lifted and skidded onto rails built on the upper element of the structure.
5. Wind load on the exterior surface (concrete and drill tower) is taken by the rest of the construction. The drilling rig will most probably be close/winterized due to weather and climate requirements, requiring that all sources for spillage shall be drained to tanks integrated in the construction.

6. The distance down to water level is estimated to be minimum 30 meters. For the most shallow areas this height may be adjusted to the local conditions.
7. The volume of the storage tanks shall be able to collect hydrocarbons from a blowout (uncontrolled event) and shall be in the order of at least 200.000 m$^3$, so that possibly a relief well may be drilled in a controlled manner.
8. The structure may be dimensioned so as to allow a reduced internal water level in the drilling cells, thereby obtaining a larger buffer capacity for storing hydrocarbons as a consequence of a possible blowout.
9. The elements forming the construction may be floated, towed and ballasted during installation and the various units are provided with guiding means or centering means, securing a proper assembly.
10. The construction has a water tight integrity so that it may maintain an internal oil fluid level above the exterior sea level.

The solution according to the invention may function as an artificial fish reeve upon completed production where the elements 19-22 are removed. Another advantage of the solution according to the invention resides in that it is possible to isolate the area for drilling, production and the living quarter. Further, the upper unit 22 may also function as a separate floater.

Another advantage resides in that according to the present invention it is possible to terminate all wells at the seabed level.

SHORT DESCRIPTION OF THE DRAWINGS

An embodiment of the invention shall be described in more details referring to the drawings, wherein:

FIG. 7 shows schematically in perspective, partly in section, a view of the upper deck supporting structure;

FIG. 8 shows a horizontal view, seen from above, of a possible arrangement of the various units on the deck, including the vertical wells extending from the deck and down to the bottom of the base structure;

FIG. 9 shows in perspective and partly in section, an embodiment of the invention, provided with means for mooring the platform;

FIG. 10 shows schematically a releasable system for interlocking the adjacent units forming the platform;

FIG. 11 shows schematically in perspective a side view seen from above of an embodiment of the base structure according to the invention; and FIG. 12 shows schematically an embodiment wherein the upper structure is used for transporting, submerging and installing an element onto the base structure.

DETAILED DESCRIPTION OF THE INVENTION

Figure 1:
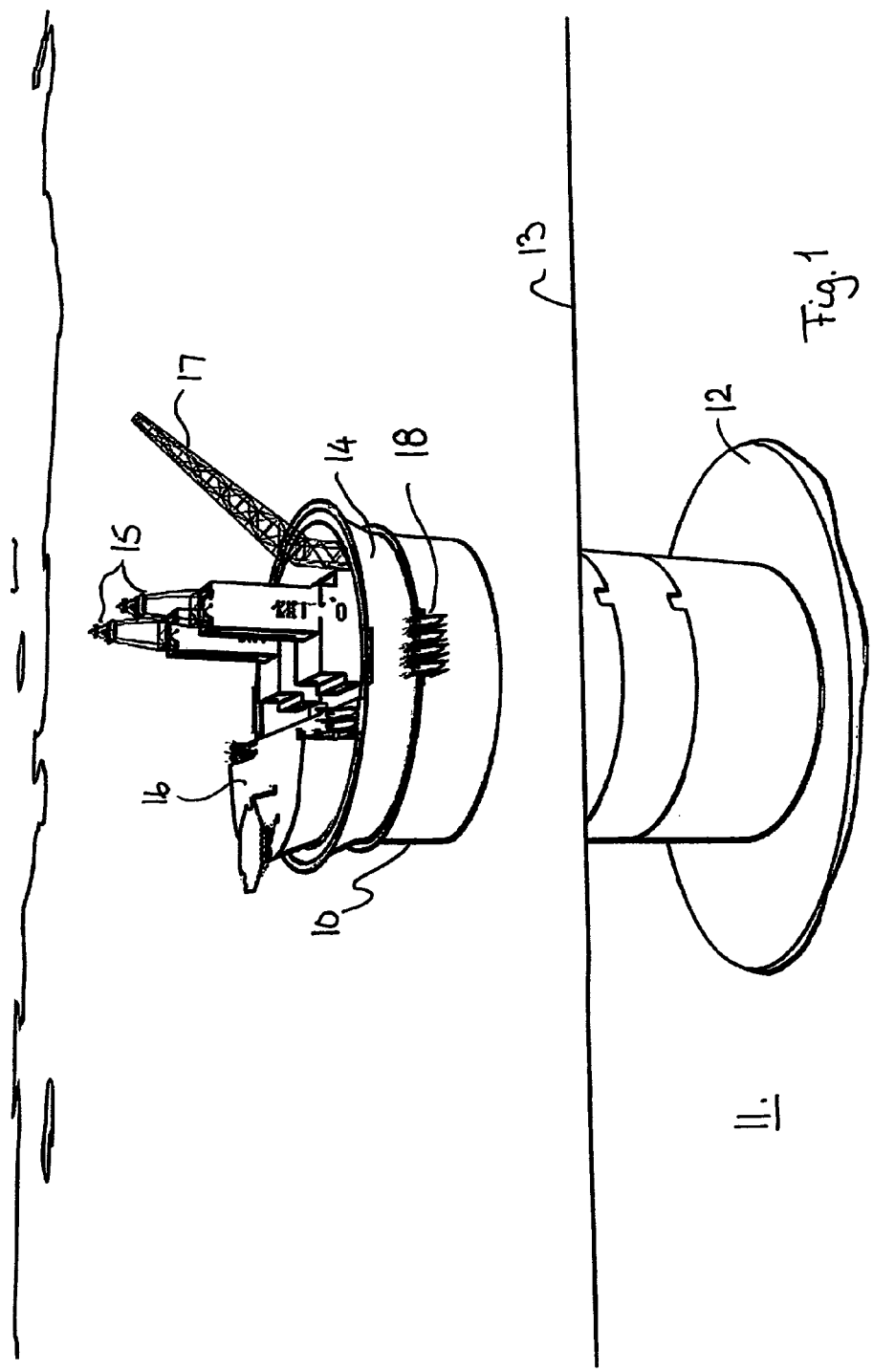
FIG. 1 shows schematically a structure positioned on a sea bed in vicinity of the coast.

FIG. 1 shows schematically in perspective a structure 10 according to the invention, installed on a sea bed 11. As indicated the structure 10 is provided with a base structure 12 pressed down into the sea bed 11 and a cylindrically shaped unit projecting upwards, which will be described in connection with FIG. 2. Above the sea level 13 the structure 10 is provided with a deck structure 14, provided with conventional units, such as drilling tower 15, living quarter 16, cranes 17 and for example life boats 18. Further, the deck structure 14 supports all such equipment and units which are necessary for drilling and/or production of hydrocarbons from wells in the sea bed.

Figure 2:
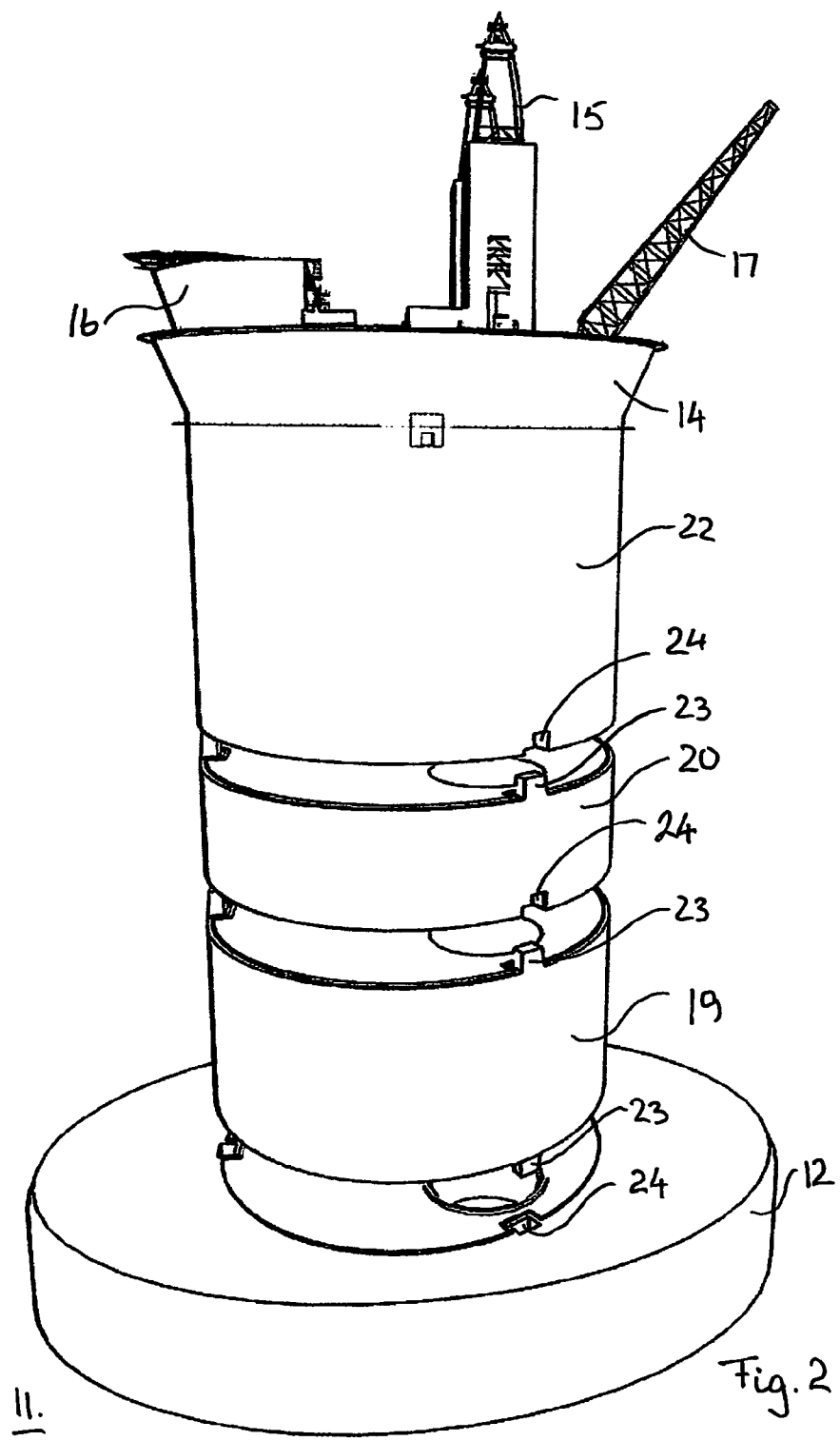
FIG. 2 shows schematically a view in perspective of the structure as such, showing the various elements forming the part of the structure.

FIG. 2 shows that the structure 10 is obtained by assembling separate concrete elements with a circular cross section. The elements may also have another shape than circular geometry, the actual requirements being the decisive factor for the chosen shape. The embodiment shown in FIG. 2 comprises a base structure 12; a first, lower section 19, intended to be positioned on top of the base structure 12; a second intermediate element 20; and an upper section 22, configured with a supporting deck structure 14. Each concrete element 12,19,20,22 is an independent unit with bottom, top and vertical wall(s), so that the elements may float and be ballasted during transport and installation. The concrete elements 12,19,20,22 are provided with guiding means 23 for securing centering during installation offshore of an element and guiding into correct position with respect to the element below. According to the embodiment shown the guiding means 23 are in the form of upwards projecting dowels or "studs" 23, while the corresponding surface on the element to be placed on top of the lower is provided with corresponding recesses 24, designed with a shape and form adapted to the dowels or "studs" 23. As indicated in FIG. 2, the lower section 19 may at its lower end be provided with downwards protruding dowels or studs, while the base structure 12 may be provided with corresponding recesses or holes 24. The purpose of such shape is that the base structure 12 shall be provided with a smooth surface, which, when the elements 19,20,22 in the future are removed, there will be no upwards protruding parts on which trawls and fishing gear may become entangled or stuck in. Alternatively, guiding and controlling means 23,24 may be in the form of dowels or studs 23 projecting downwards from the bottom surface of the elements above, while the recesses or holes 24 may be arranged on the upper surface of the elements 12,19,20,22 below. If desired the platform may comprise of additional intermediate elements (nor shown). The number of elements are governed by the water depth at which the platform shall be installed and the height of each elements used.

In order to secure a water and pressure tight connection between adjacent sections 19-22, the joints and connections between adjacent surfaces may be grouted or injected by a sealing material of any known and conventional type. The sealing material may preferably, but not necessarily, be of a type which allows or makes possible, removal of the sections 19-22 at a later stage. Such material may for example be a floatable elastomer.

Figure 3:
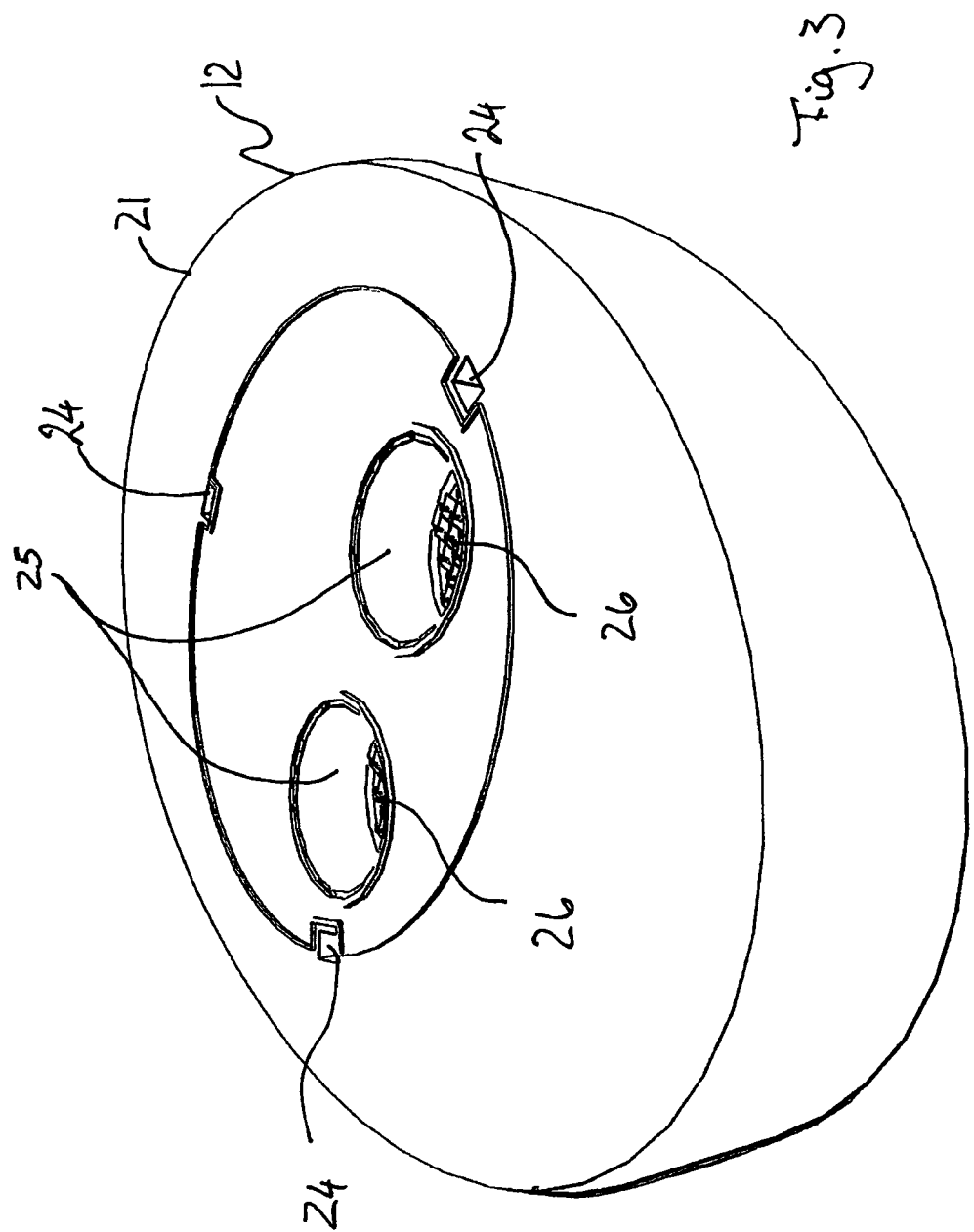
FIG. 3 shows schematically a view in perspective seen from above of an embodiment of the base structure intended to be installed on the sea bed.

FIG. 3 shows a view in perspective, seen from above, of an embodiment of the base structure 12 according to the invention. In order to secure that fishing gear or the like does not become stuck on or entangled with the base structure 12 upon completed drilling and/or production, the peripheral edge 21 of the base structure may be chamfered (not shown). As further indicated in FIG. 3 three recesses or holes 24 are arranged in the top surface for receipt of correspondingly shaped, downwardly protruding or projecting dowels 23 fixed to the bottom surface of the lower, intermediate section 19.

As further indicated in the FIG. 3, the base structure 12 is provided with two cells which are intended to be co-axially aligned with corresponding cells (not shown) in the remaining elements 19-22, forming a drilling shaft 25 extending from the bottom to the deck. The drilling shafts 25 are so interconnected that watertight integrity is obtained. This effect is achieved by applying a scaling material at suitable locations in the joints. The cell 25 is at its lower end terminated by a bottom plate or slab closing the cells from inflow of water into the cell, the slab also supporting a large number of bottom valves 26 for future wells.

Figure 4:
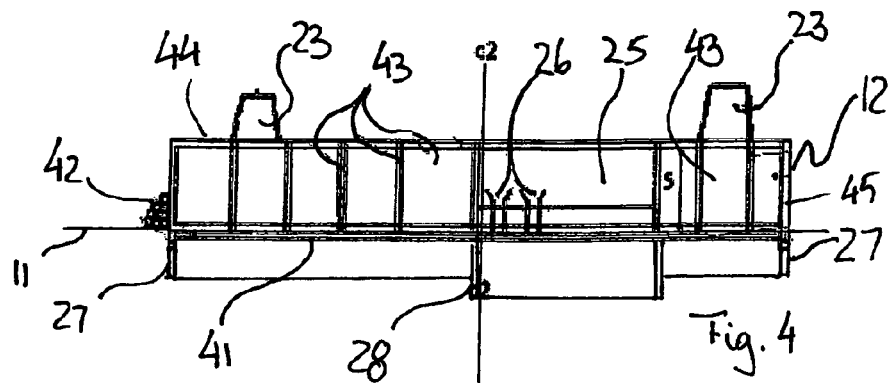
FIG. 4 shows schematically a vertical section through the base structure, seen along the vertical center plane of the base structure.

The base structure 12 will in the following be described in further detail, referring to FIG. 4. FIG. 4 shows a vertical section through the base structure 12, seen along a diametrical plane. The base structure 12 is designed for the actual geotechnical conditions appearing on the installation site. On the bottom surface of the base structure 12, the base structure may be provided with downwardly open skirts 27 extending down from the bottom surface of the base structure 12, the skirts 27 being configured to be pressed/sucked into the seabed. Said cells 25 may also preferably be provided with downwardly projecting and downwardly open skirts 28, intended to be pressed down into the seabed when the concrete element is installed on the seabed and is ballasted. The skirts, forming a continuation of the walls of the cells 25, prevent gliding of the platform on the seabed and also preventing spillage or leakage from shallow pockets of gas in the seabed. Should there be a need for long skirts, the base structure 12 may be provided with a suction mechanism, such as a suction anchor. The cavity between the seabed 11, the skirts 27,28 and the base plate 41 of the base element 12 may preferably be grouted by grout in order to obtain stability subsequent to placement on the seabed. The base structure 12 is further provided with a top plate or slab 44 and side walls 45. In order to best secure stability during submerging and lowering and until completed grouting operations, the room formed between the skirts and the base plate 41 of the base structure 11 may be divided into separate rooms, for example by means of dividing walls, skirts or the like (not shown) and possibly also by additional skirts.

Around the installed base structure 12 a layer 42 of stones or gravel may be arranged so as to prevent ocean or tidal current to carry away the seabed material around the base structure 12. The skirts 28 below the drilling shaft or cells 25 may be constructed in such way that these skirts penetrates deeper than the skirts 27 arranged along the periphery of the base structure 12, in order to provide highest possible integrity with respect to the surrounding seabed soil. The base structure 12 is further provided with a number of cell walls 43, so that a large number of cells are formed inside the base structure 12. According to the embodiment shown in FIG. 4, the base structure 12 is provided with upwards projecting dowels or studs 23. This is contrary to the embodiment shown in FIGS. 1-3. This will imply that the lower end of an adjacent element 19 will be provided with corresponding recesses or holes 24.

Also the termination 26 of the wells are indicated in the bottom of the cells 25 forming the vertical shaft intended to extend up above the sea level. The cells are terminated at their lower end by a fluid tight bottom slab formed with a number of penetrations for drilling strings/production risers. On level just above the bottom slab, each of the production risers is provided with a closing and choking valve at seabed level. This enables use of high pressure risers up to deck level where BOP stacks are installed, the top also being connected to a choke system that may be arranged together with a choke/kill system with return to a collecting tank system. The system may also be provided with a fluid return system and/or diverter system on deck level with return to the collecting tank.

When the drilling operations has been completed, all the platform elements 19-21 may be removed, while the base element 12 is left on the seabed with the closing valves shut off, alternatively, the production casings being cemented. As a further alternative, a wellhead Christmas tree with corresponding pipelines may be connected to the Christmas tree for transport of produced hydrocarbons and connected with another production unit for transport of produced hydrocarbons to a production and/or transport facility.

Figure 5:
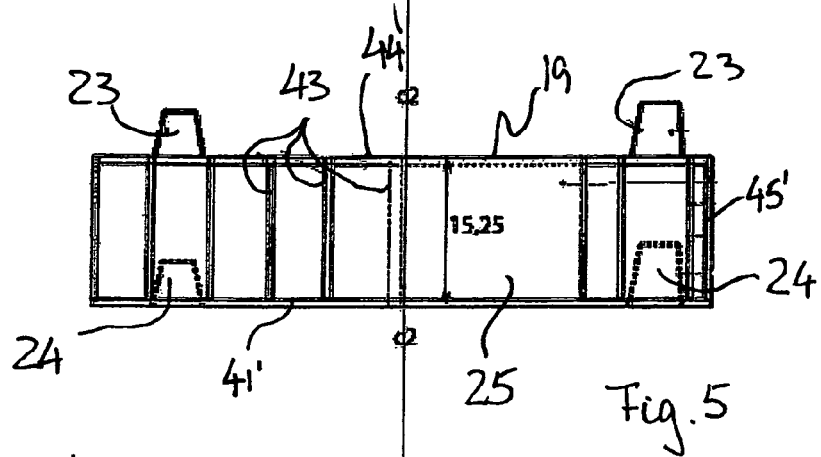
FIG. 5 shows schematically a vertical section through an intermediate substructure part, intended to be positioned on top of the base structure shown in FIG. 4.

FIG. 5 shows schematically a vertical section through a middle section 19, intended to be placed on top of the base structure 12. As indicated in the Figure this intermediate structure is provided with a bottom slab 41', provided with an opening in the slab and a upwards arranged recess 24, intended to cooperate with an upwards projecting dowel or stud 23 on the element 12, onto which the intermediate element 19 is to be placed. Further, this intermediate element 19 is also provided with a top slab 44' and sidewalls 45'. Further, the middle structure 19 is provided a number of cell walls 43, forming separate cells. This structure element 19 is also provided with one or more wells or drilling cells 25 without a bottom or top. The cell(s) 23, extending through the element 19, is/are concentrically oriented with respect to corresponding cell(s) in the base structure 12.

Figure 6:
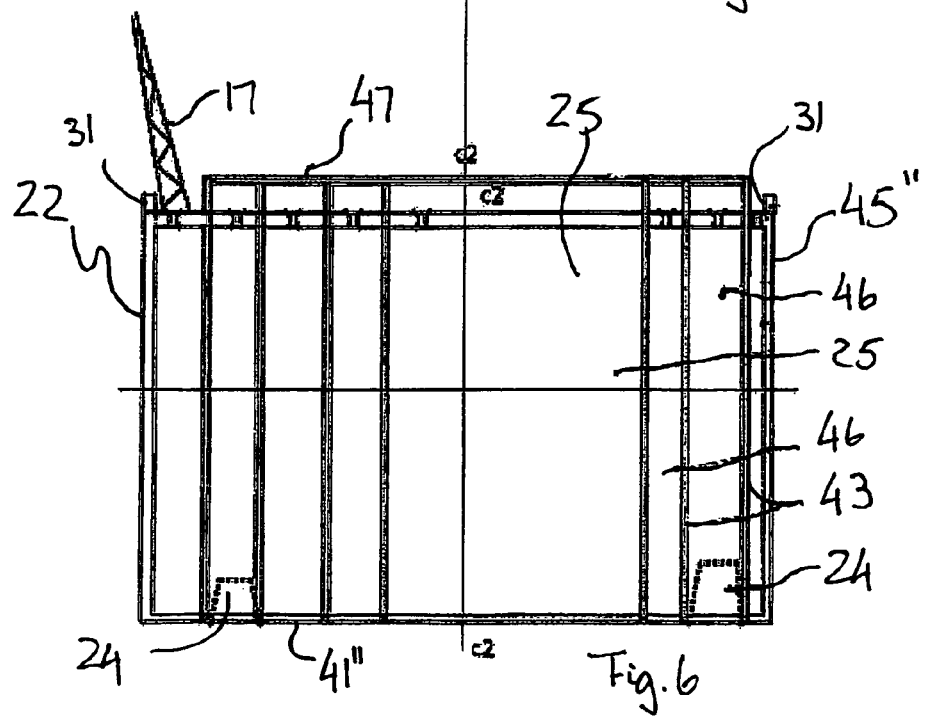
FIG. 6 shows schematically a vertical section through the upper, deck supporting structure 22, seen in the same vertical plane as the base structure and the intermediate structure shown in FIGS. 4 and 5.

FIG. 6 shows schematically a corresponding vertical section through the upper unit 22, without showing the deck structure. This unit 22 is provided with a bottom slab 41", side walls 45" and a deck structure 47. The unit 22 is further provided with one or more cells 25 open at both ends and extending vertically up through the unit, coaxially arranged with the cells 25 in those units which are installed beneath, thus forming said vertically extending drilling shaft. At its lower end, at the level of the bottom slab 41", corresponding downwards open recesses 24 are arranged for co-acting with the upwards extending dowels 23 on the element below.

FIG. 7 shows schematically in perspective, partly in section, the upper deck supporting structure 22. As shown, this structure 22 is at its upper end provided with a deck structure supporting two drilling towers, arranged on top of each drilling cell 25, a crane 17, a living quarter 16 with a helicopter deck and life boats, suspended on the exterior of the platform. As indicated in the Figure also the upper element is provided with a number of cells 46, which during towing function as buoyancy and ballast tanks, and during operation, in the case of unintended oil leakage also will function as a collecting tank for leaked oil. Also the other elements 12,19,20 may possibly be provided with such cells. According to the embodiment shown these cells 46 have a hexagonal cross section. It should be appreciated, however, that the cells may have any other suited cross sectional shape, such as triangular, quadrilateral, circular or a combination of circular and polygonal cross sectional shape.

The height of the concrete base element 12 is chosen so that the total concrete construction consists of a minimum number of elements which may be stacked on top of each other. The submergence of each element 12,19-22 is performed in a controlled manner by means of ballast tanks (not shown), for example in the same manner as for installation of the seabed anchor units for the Heidrun tension leg platform.

The guiding means 24, which may be in the form of a recess in the upper surface of the base element 12, may for example comprise a recess in the top slab, intended to receive a correspondingly shaped male, robust and strong dowel 23 of a suitable material with different length, (possibly 10 meter), embedded in the bottom section of the lower element 19 and projecting down from said bottom slab, positioned co-axially with the recesses 24 in the base structure 12. The guide dowel 23 having the largest length, comes first into engagement whereupon the position of the approaching element 19, alternatively element 20, 21 or 22 to be mated with the base structure 12, is adjusted so that the position to the next dowel is aligned with its recess, etc. The solution shown has three such guides 23,24 between each element. It should be appreciated, however, that the number may vary, dependent on the requirements for transfer of loads and forces between the elements 19-22. The base structure 12 is provided with reinforced, stiffened sections (not shown) intended to take and resist the loads and forced induced by the elements 19.22 above. A strong and rigid structure is assumed. Alternatively, it may be desirable to provide the base structure 12 with upwards protruding guides 23 adapted to corresponding recesses or holes 24 in the bottom slab of the elements 19-22 above.

The base structure 12 may be provided with guiding tubes for future wells, forming an integral part of the base structure 12, so that it may be possible to drill wells through these from above sea level subsequent to completed installation of the elements 12,19-22. The concept may also introduce a cutoff valve (not shown) placed in the base structure 12 in connection with the guide tubes or the risers as an additional barrier, connected to the high pressure riser, terminating at deck level by conventional blow out preventer (BOP) and safety valves.

When the other elements are removed in case there are no further need for the construction 10, the base element 12 may be constructed and designed so that the base may remain on site, while the other element 19-22 are removed, the base element being designed so that it does not cause any obstacles or inconvenience for fishery and at the same time functions as a substrate for fast re-vegetation of the natural bottom fauna. It should be noted that hydrocarbons shall not be stored in the base element 12, so that the base element does not contain any polluting substances when it is left on site.

The height of the base element 12 is determined by the water depth, the geotechnical conditions and expected sinking into the seabed soil and is adapted to the height of the other elements 19-22 which are removable. A typical height may be 15 m. The height should not be less than 10 m, since the element 12 then easily may lack sufficient sturdiness or rigidity if it becomes to "shallow". On the other hand, the height should not exceed 25 meter above the seabed since the base element is intended to be left on the seabed upon completed operation. On the top slab 29 of the base element 12 and on the guiding means 23,24, a layer of elastomer or another material (not shown) with a thickness of 0.25 m may be arranged so that loads from the elements 19-22 resting on top of the base structure are evenly distributed on the top slab 29.

As indicated in FIGS. 4-6 the intermediate elements 19-22 are positioned successively on top of the base element 12 and/or on a previously positioned element. FIG. 4 shows the stage where the base element 12 is installed on the seabed 11 with the skirts 27,28 pressed down into the seabed 11, and where the first intermediate element 19 is not yet in a position above the base element 12, in correct position with respect to the base element.

All the elements 12,19-22 are provided with vertical openings or recesses 24 for receiving the guiding means 23, possibly dowels, as a part of the element placed below or the element to be placed on its top as the case may be, thereby guiding the elements 19-22 into position. The intermediate elements 19-2 are constructed independently of each other and floated into position above and then ballasted. Also the intermediate elements 19-21 are provided with guiding means 23 for positioning of the elements 19-22. The intermediate elements 19-21 are provided with large, openings or cells 25 ("drilling shafts") extending through the elements, the openings being axially aligned with respect to each other so that cells are formed, extending from the deck 15 to the base plate or slab of the base element 12. On the base slab 41 guiding casings for the future wells to be drilled from the drill deck 14 on the upper element 12 are installed, the well casings penetrating through the well recesses in the lower part of the base element 12. The construction allows the intermediate elements 19-21 to be filled with hydrocarbons if the capacity of the top element 22 so requires. Reinforcing and stiffening structures are a requirement for structural integrity. Elastomer plates (or plates of another suitable material) may be arranged between the adjoining elements in order to distribute load to the top slab 29. Such plates may also be arranged on top of the guiding means 23 and possibly in the openings or recesses 24 for the guiding means 23.

The "drilling shafts" extending through the platform 10 are assembled in such way that watertight integrity is achieved for the joint. This is achieved by sealing off the joint by means of a suitable sealing material.

The height of the intermediate elements 19-21 may typically be of a standard size since the elements are intended for re-use on another location. Typical height of the elements may be 25 and 50 meters when interconnected with the upper top element 22 (which is in the form of a floater in concrete): Such floater may either be connected directly to a base element 12 or to an intermediate element 19-21. Hence, the concept according to the present invention covers a considerable span of water depths, at the same time as being removable. The top element 22 has a typical height of 40 meter below middle water level and it is considered that the height above sea level (typical 30 m) is sufficient to avoid filling the element 22 with sea water in situation with extreme waves.

The assembled construction 10 may for example be adapted to different water depth employing the following combination of elements 12,19-22:

The base element 12 has a height in the range of 10-27 m.
The intermediate element 19 may have a standard height of 25 m.
The next element 20 may have a height of 50 m.
The top element may have a height of 35 to 42 m, below water line and preferably 30 m above water level.

An example of an assembled construction:
No intermediate element: 10 to 27 m plus 35 to 42 m, covering water depth between 45 m and 69 m, ref. the solution disclosed in FIG. 9.
An intermediate element: 10 to 27 m plus 25 m plus 35 to 42 m, covering depths between 70 m and 94 m.

A large intermediate element: 10 m to 27 m plus 50 m plus 35 to 42 m, covering the range of water depth between 95 and 119 m.

Two intermediate elements: 10 to 27 m plus 25 m plus 50 m plus 35 to 42 m, covering the range of water depths between 120 m to 144 m, ref. the solution disclosed in FIG. 8.

If larger depths are to be covered, the height of the intermediate elements has to be adjusted. It may for example be possible to cover larger depth by choosing to construct a top element 22 with larger depth.

The top element 12 are to be connected to the element(s) 19,21 placed below, as described above. Positioning is achieved by introducing the guide means 23 on the lower element into the openings 24 on the structure above, such as described above with respect to how the intermediate structures 19-21 are positioned in top of the base structure 12. In shallow waters the top element 22 may be positioned directly on top of the base structure 12 below. Here, the top element 22 will form an integrated part of the total platform structure 10. For disconnecting this element 22 will again become a floater until it is installed on top of a new base structure 12 and the other already installed sections 19-22 at a new offshore location. It should be noted that the top element 12 may be manoeuvered more easy than the rest of the elements 19-21, since such element will have a substantial volume above the sea level. The top element 22 has a sufficient volume to be able to collect the volume of hydrocarbons leaking from a well out of control. This tank volume is formed by divisional bulkheads, forming more or less separated storing cells 30 which may be used for ballasting in the installation phase. The position of the bulkheads is chosen so as to secure that the strength of the construction 10 satisfies the safety requirements for such type of constructions in all phases and load conditions.

As mentioned above, FIG. 8 shows schematically a vertical section through the upper deck supporting section 22. According to an embodiment of the invention the upper section has an upper rim 31 which collects all liquid coming out of the well in case of an unintended event where the well cannot be controlled by means of the prior art barriers. The embodiment shown is in principle in its most simple form. This part of the top element 22 is ventilated for gas with sufficient capacity against the surplus gas flare system (not shown). The well liquid flows in a controlled manner to dedicated tanks 46 which eventually are filled with unstable well liquid, eventually containing water, gas and different other types of hydrocarbons. According to the disclosed principle solution, the liquid will eventually fill up the drilling shafts 25 until the liquid level in these cells reaches a certain height where the liquid is flowing from the drilling shaft(s) to one or more of the dedicated cells 46. The system may for this purpose be provided with no-return valves (not shown) in order to prevent gas from escaping from the tanks 30 and with piping system enabling filling of the respective tanks 48. This mixture will produce gasses which are easily ignitable and hence should be vented out of the construction through a flare burner (not shown). The top element 12 is described above. The top element 12 shall support a deck structure 14 containing drilling equipment, i.e. drilling rig(s) 15, mud systems and power generating source(s). The deck structure 14 shall have capacity for supporting all required functions for normal drilling operations. The system also includes an export system enabling empting of the tanks on a continuous basis for transport away from the unit to a station for cleaning the transported fluid. Although natural venting is shown, it should be noted that the system also or instead of, may comprise forced draining, for example by means of pumps and suitable separate piping system.

The construction may also include production systems so that it may serve as a production platform if sufficient volumes of hydrocarbons are found. Such production system may be installed when a sufficient process need is identified. For transport of oil or gas to shore it is usual to incorporate a first stage system for separating water and a compressor package for transport of produced liquid. Since the production system is installed after installation of the platform, the deck 14 must have an area available for such system. Hence, the drilling plant is positioned somewhat eccentric to one side of the deck and not in its centre, which otherwise would have given a more beneficial geometric configuration of the construction. It may also be possible to substitute a top element tailor made for drilling with a tailor made top element for long term production.

If desirable, the concepts enables drilling of a large number of wells towards several reservoirs/prospects. A realistic number may be up to 80 wells. Up to 40 wells may for example be arranged in each of the two vertical openings ("drilling shafts") 25. The wells are drilled by drilling towers 15 placed over said openings. When drilling in new reservoirs, all production from one of the groups of wells may be closed, so that production only is provided from wells in the other group of wells. In order to be able to place 40 wells in one group of wells, the diameter of the cell 25 should be in the order of 30 m or more. Said cell openings for the wells may then be positioned somewhat eccentric with respect to the deck 11 so that the requirement for positioning of production equipment as specified above are satisfied.

A geometry is chosen for the ballast and/or collecting tanks for hydrocarbons with bulkheads so that the require strength is present. Typical diameter for the top element, giving a storage volume of approximately 200,000 m³ for the ballast and/or collecting tanks will be a diameter of 100 to 120 meter, the best estimate being 110 m. The wave forces acting on such structure will be large and will be a dimensional criterion for the guides which typical may be in the form of strengthened steel cones with a diameter of 5 m or more and with a height of up to 10 m.

The said cell openings for the drilling operation ("drilling shafts") extend vertically between the elements 19-22 and in the base element 12, so that a well may be placed and completed at the surface and can be drilled through the drilling recesses 26 in the base structure 12. In order to secure access for a ROV for example, in these openings the diameter of the opening may be larger in the intermediate elements 19,20 than in the top element 22. When drilling is completed, it is assumed that the wells are plugged so that the base element 12 no longer function as a barrier.

FIG. 8 shows a way of arranging the deck. It should be noted, however, that the solution shown is not necessarily the only way. The arrangement may be varied without thereby deviating from the inventive idea.

FIG. 9 shows schematically in perspective and partly in section, an embodiment of the invention, provided with anchoring means. The anchoring means comprises a plurality of substantially vertically tensioned cables 50, where each cable 50 at its lower end is fixed to an embedded anchor 51 in the concrete base slab 12, the area around the embedded anchor 51 being reinforced in order to take care of the forces imposed on the base structure due to the tension in the tensioned cables 50. From the base slab 12 the tensioned cables extend up towards the deck via fairleads 52 fixed to the platform wall below deck level and preferably, but not necessarily also below sea level, and further to a powered winch drum on a winch 53 on the deck. By means of the winches 53, it will thus be possible to vary the tension in the tensioned cables 50 dependent of the wave height, the appearing wave forces and its effect on the platform and henceforth the wave direction Further, the anchoring means according to the present invention comprises a conventional mooring system comprising a number of mooring lines 55, where each mooring line 55 at one end is fixed to a conventional suction anchor (not shown), sucked down into the seabed 11 at large distance from the platform 11. The mooring lines 55 may at this end be in the form of a conventional mooring line with a long, heavy chain resting on the seabed 11 and a wire or chain extending up to the platform via a fairlead 52 on the platform 10 at its upper part and further to a winch drum on a winch 53, arranged on the platform 10 deck. The mooring line and the suction anchor are of a conventional type, well known to the person skilled in the art.

The number of tensioned cables 50 and mooring lines 55 may vary from one embodiment to another without thereby deviating from the inventive idea. Further, the mooring system may be configured such that the succession between tensioned cables and mooring lines are alternating. Also the tension in the mooring lines 55 may be varied in the same manner as for the tensioned cables 50, in order to compensate for varying wave forces and wave direction.

As indicated in FIG. 3, the platform may be provided with a number of hydrocarbon transfer pipes. At the level of the bottom of the base structure sealed drilling string recesses are arranged, each being provided with a cutoff valve 26, while safety valves (not shown) preferably may be positioned at the deck level. High pressure risers may preferably extend between the cutoff valves at the bottom slab level and the safety valves at deck level. The cutoff valves 26 are of a type which both may temporarily close, and cut off the fluid flow, so that the flow of hydrocarbons from the wells may be stopped at the bottom level of the structure 10. This enables a simplified removal of the units placed on top of the base structure, if and when this should be necessary or desirable.

In relation to the embedded anchor points 51 in the base structure 12, 40" conductor tubes 56 may for example be drilled or piled down into the seabed, such conductor tubes being rigidly fixed to the bottom slab of the base structure 12. Said conductor tubes may function as extra fixing of the structure 10 to the seabed in order to counteract any tilting moments of the platform at seabed level and in addition to function as the lower attachment and fixing point for the vertically tensioned cables 50.

FIG. 10 shows schematically a releasable system for interlocking adjacent sections 19-22. For clarity the platform sections 19-21 are shown transparent and without the internally arranged shafts for drilling or cells. Said interlocking system is the forth element used for securing a rigid interlocking of the various sections forming the platform 10. The forth interlocking system comprises a number of vertical locking bolts or tie rods 57, whereof only one such tie rod 57 is shown in FIG. 10. The tie rods 57 are intended to be inserted into corresponding holes or ducts 54 extending through the concrete wall in one section 19-21 and are further intended to be in communication and be axially alignment with a corresponding opening or hole 54 in the neighboring section 19-21 below. The vertical tie rod 57 may for example be made of a tube shaped body which at its lower end is provided with a locking surface 70, intended to be co-acting with a corresponding locking surface 58, embedded in the lower end of the adjacent opening 54 in the neighboring section 19,20 below. The lateral distance between two consecutive tie rods around the periphery of the sections may preferably be 30 degrees, i.e. in such case twelve tie rods 57 are used for interlocking one section 22 with the next section 21 below. Said locking tie rods 57 may preferably be configures and positioned such that said locking tie rod 57, for locking the section 21 to the next section 20 below, are displaced by 15 degrees with respect to the adjoining locking tie rod 57 for locking of section 20 to the section 19 below. In such manner a sideways displacement of 15 degrees is established, and the corresponding displacement will be valid for the next joints below between the next sections below, if relevant (not shown). According to such solution, an excellent distribution of the forces acting over the joints between to consecutive sections 20-22 is provided.

The locking function between the lower end 70 of a locking tie rod 57 and the corresponding locking means 58 embedded in the section below, is so configured that the locking forces are increased the more the cylindrical locking tie rod 57 is rotated, although the maximum possible rotation of the cylindrical tie rod may be 90 degrees in order to achieve maximum locking force. Also the upper end of each locking tie rod 57 may be provided with a locking unit 70 which co-acts with a locking unit 58, embedded in the wall of the hole or the duct 54 for simultaneous locking also of the upper end of the locking tie rod 57, interlocking two consecutive sections 2022, so that two consecutive sections 12,2022 are interlocked. In order to insert a locking tie rod 57 into the duct 54 the opening of the duct 54 may have a keyhole shape, i.e. circular with a cube shape extension in one direction, such that the locking tie rod 57 only is allowed to be rotated when the upper and lower locking means 70 fixed to the tie rod 57 are at the same level as the corresponding locking means 58 in the ducts 54.

If the sections are to be separated, for example for removal of the platform, the cylindrical locking tie rods 57 are rotated 90 degrees in opposite direction, whereupon the locking effect is suspended and the cylindrical tie rods 57 then may be pulled up and remove from the duct in the concrete structure where they previously has served as locking means.

FIG. 11 shows schematically a view in perspective of the base structure according to the present invention. The Figure shows two shafts with cell bottoms and pipe recesses 26 in one of the two shafts 25. Further, the Figure shows the conductor tubes 57 for deep anchorage of the base structure 12, and the fixing points for the lower ends of the tensioned cables (not shown). In addition three recesses 23 for receipt of the centering dowels (not shown) are indicated. Due to clarity, the ducts 54 for the locking tie rods, intended to lock the lower section 19 to the base structure, are not shown.

FIG. 12 shows schematically a solution where the upper body 22 is used for transporting and lowering down an element 19 on to the base structure 12. According to this embodiment the upper body 22 is considered to be a floater which also prior to installation of the base section 12 may be used for drilling of wells if this is desirable. For suspending the body 19 to be floated out and submerged on to the base structure 12, the wire system comprising said winches 53, fairleads 52 and the vertical cables tying the sections to the base structure 12, may be used.

A section 19 may for example be built in a dock and then transported out to the field on a suitable vessel and then launched, for example by ballasting the transporting vessel so much that the section 19 floats off. Thereupon, the section 19 may be connected to the floating section by employing the above mentioned anchoring system for successive lowering of the section 19 down towards the base structure 12 in a controlled manner. When the lower section 19 is installed on the base structure, the next section 20 may be installed in the same manner till the complete floating unit 22 is installed and connected to the base structure 12 by means of the winches 53, the fairleads 52 and the vertical cables 50. In parallel the suction anchors 54 is installed and connected to the mooring chain, connecting the mooring lines from the winches with the anchor chain through the fairleads 52. The floating unit is provided with buoyancy chambers, ballast tanks and a pump and piping system for adjusting the draught of the floating unit. Such system is of a type which is well known for a person skilled in the art.

At least one of the bodies 19,20,21,22 according to the invention may completely or partly be used as water reservoir for fresh water. In order to secure the stability, these bodies 20,21,22 may be provided with buoyancy chambers filled sufficiently with air in order to establish a system so that the centre of buoyancy will be above the centre of gravity, even when not taking the water line inertia of the floating body 20,21,22 into account. According to this embodiment this element may be filled with fresh water which later on may be used in the production process for supply of liquid during desalination, used for injection into the reservoir for enhancing the oil production.

According to a second embodiment of the invention the upper section may be provided with an outwards projecting part intended to break up and deflect drifting ice. The upper floating body 22 may for this purpose be provided with an outwards projecting rim or bulb 60 extending around the entire periphery of the floating body 22, the bulb 22 being positioned in the waterline area. The bulb may for example have a triangular cross sectional shape where the top point of the triangle is positioned just below the sea level, so that the drifting ice will slide up on the upper surface of the bulb 60 and break into smaller parts, sliding off and around the installed platform. The platform 10 may for this purpose be provided with a steel plated surface in the waterline region, securing that the concrete will not erode in this area, exposing the reinforcement.

Even though the material used is concrete, it should be noted that the platform according to the invention as an alternative may be made steel, alternatively of a combination of steel and concrete.

The invention claimed is:

1. Platform for controlled containment of oil and condensate, comprising:
   a support structure;
   a deck superstructure positioned on top of the support structure, from where drilling may be performed, the support structure comprising collecting tanks which form an integrated part of the support structure; and
   a base structure configured to rest on a seabed, and comprising a number of separate buoyancy bodies placed on top of each other and interlocked, and resting on the base structure by means of the weight of the buoyancy bodies, the buoyancy bodies interlocked to the base structure by means of vertically tensioned cables evenly arranged around a periphery of the platform, and extending between the base structure and winches arranged on the deck superstructure via fairleads, so as to be able to adjust the tension in the cables in order to withstand appearing forces and moments acting on the platform, and a plurality of mooring cables anchored to the sea bed at a large distance from the platform, the mooring cables being connected to the platform via fairleads and winches.

2. Platform according to claim 1, wherein all elements forming the support structure, are provided with vertical openings for drilling shafts extending in aligned manner through the platform, for positioning of wells and well recesses in a lower part of the base structure, and further with drilling equipment positioned on top of the deck superstructure.

3. Platform according to claim 2, wherein the drilling shafts are configured so that the joints during assembling are sealed such that watertight integrity for the shafts is established.

4. Platform according to claim 1, wherein a cutoff valve is positioned in the base structure as an extra barrier for a high pressure riser, the riser being terminated at deck superstructure level by a blowout preventer (BOP) and a valve assembly.

5. Platform for controlled containment of oil and condensate, comprising:
   a support structure;
   a deck superstructure positioned on top of the support structure, from where drilling may be performed, the support structure comprising collecting tanks which form an integrated part of the support structure; and
   a base structure configured to rest on a seabed, and comprising a number of separate buoyancy bodies placed on top of each other and interlocked, and resting on the base structure by means of the weight of the buoyancy bodies, the buoyancy bodies interlocked to the base structure by means of vertically tensioned cables evenly arranged around a periphery of the platform, and a plurality of mooring cables anchored to the sea bed at a large distance from the platform, the mooring cables being connected to the platform via fairleads and winches,
   wherein the base structure is fixed to the seabed by means of a plurality of piles or conductor tubes, pressed and cemented down into the seabed,
   wherein a fixing point for the vertically tensioned cables coincide with upper ends of the piles or conductor tubes.

6. Platform according to claim 5, further comprising locking tie rods movably arranged in conductor ducts and extending across a joint between two consecutive platform sections, each locking tie rod at its upper and lower end being provided with locking surfaces co-functioning with corresponding locking surfaces in the conductor ducts, wherein each locking tie rod is configured to be locked by rotating the locking tie rod with respect to the duct.

7. Platform for controlled containment of oil and condensate, comprising:
   a support structure;
   a deck superstructure positioned on top of the support structure, from where drilling may be performed, the support structure comprising collecting tanks which form an integrated part of the support structure; and
   a base structure configured to rest on a seabed, and comprising a number of separate buoyancy bodies placed on top of each other and interlocked, and resting on the base structure by means of the weight of the buoyancy bodies, the buoyancy bodies interlocked to the base structure by means of vertically tensioned cables evenly arranged around a periphery of the platform, and a plurality of mooring cables anchored to the sea bed at a large distance from the platform, the mooring cables being connected to the platform via fairleads and winches, wherein construction elements forming the supporting structure are configured to be assembled by means of guiding means or dowels and corresponding openings or recesses in the position of the element over or below the guiding means or dowels.

* * * * *